United States Patent [19]

Tomozawa

[11] Patent Number: 4,598,805
[45] Date of Patent: Jul. 8, 1986

[54] COASTER BRAKE
[75] Inventor: Shigeo Tomozawa, Osaka, Japan
[73] Assignee: Nankai Tekko Co., Ltd., Osaka, Japan
[21] Appl. No.: 631,229
[22] Filed: Jul. 16, 1984
[30] Foreign Application Priority Data Feb. 28, 1984 [JP] Japan .............................. 59-28782[U]

[51] Int. Cl.⁴ ............................................ F16D 67/02
[52] U.S. Cl. .................................................. 192/6 R
[58] Field of Search ................................. 192/6 R, 6 A

[56] References Cited

U.S. PATENT DOCUMENTS 1,356,052 10/1920 Duchesne ..................... 192/6 R
2,079,284 5/1937 Gearing ........................ 192/6 R

FOREIGN PATENT DOCUMENTS 280353  1/1927 Fed. Rep. of Germany ..... 192/6 R
781565  2/1935 France ........................ 192/6 R
207039 11/1923 United Kingdom ............... 192/6 R Primary Examiner—Allan D. Herrmann
Attorney, Agent, or Firm—Koda and Androlia

[57] ABSTRACT

A coast brake of the type having a screw cone provided with a tapered part to be screwed into an internal end part of a male screw cylinder to which a chain gear is fixed, the screw cone being removed by means of the rotation of the male screw cylinder. A brake shoe is in mesh with a fixed brake cone which is provided outwardly of the screw cone to engage with a hub body by pressing the brake shoe being expanded. The coaster brake further includes: a cylindrical part smaller in diameter than a top end part of the brake cone being provided on one end part of the brake cone; a clutch spring with a projection being fitted on an outer periphery of the cylindrical part to exert a force in a direction of fastening itself when a negative rotational force works upon the projection around the cylindrical part; and an axial notch part provided on the screw cone, the projection of the clutch spring being in mesh with this notch part.

1 Claim, 4 Drawing Figures

COASTER BRAKE

BACKGROUND OF THE INVENTION

1. Field of the Invention

The present invention relates to a brake for bicycles and more particularly to a coaster brake mounted on the rear wheel shaft of a bicycle for stopping the bicycle with the reverse rotation of the pedal.

2. Prior Art

Existing coaster brakes, which are mounted on the shaft of a bicycle rear wheel, include a male screw cylinder rotated by means of a pedal, and a screw cone having a tapered outer surface. The screw cone is screwed to the male screw cylinder to adapt an axial motion of the screw cone. Thus the screw cone presses the brake shoe, which is divided into two sections, to widen it so that the brake is stuck fast to the inner surface of the hub body, thereby putting the braking action into effect.

Nevertheless, when the screw cone to axially moved is not given fractional resistance, the screw cone is likely to skid together with the male screw cylinder resulting in no braking action.

In order to prevent such skidding of the screw cone, for example, Japanese Utility Model Application Provisional Publication No. SHO 56-35433 discloses various kinds of devices in which a clutch spring is fitted into the brake cone so that the clutch spring partially contacts the screw cone. Since all of the conventional brakes have a clutch spring slidably in contact with the internal surface of the cylindrical screw cone so that the resultant resistance unavoidably has a narrow limit, sliding is easily caused; however, the screw cone may still sometimes skid. In particular, when the brake is used for a long time it causes wear and deformation, increasing the possibility of skidding.

SUMMARY OF THE INVENTION

The present invention, which has been created in light of the foregoing points, reduces the probability of skidding of the screw cone completely and ensures as accurate as possible braking by adapting a clutch spring which is fitted into a brake cone and a fixed member to be in mesh with a partial portion of the screw cone.

A coaster brake of the type having the screw cone provided with a tapered part to be screwed into an internal end part of a male screw cylinder to which a chain gear is fixed, the screw cone being removed by means of the rotation of the male screw cylinder. A brake shoe is in mesh with a fixed brake cone which is provided outwardly of the screw cone to engage with a hub body by pressing the brake shoe being expanded. The coaster brake is characterized in that a cylindrical part of smaller diameter than a top end part of the brake cone is provided on one part of the brake cone; a clutch spring with a projection is fitted on an outer periphery of the cylindrical part to exert force in a direction of fastening itself when a negative rotational force works upon the projection around the cylindrical part; and an axial notch part is provided on the screw cone, the projection of the clutch spring being in mesh with the notch part.

BRIEF DESCRIPTION OF THE DRAWINGS

The following description of the embodiment of the coaster brake of the present invention will made in conjunction with the accompanying drawings wherein.

DETAILED DESCRIPTION OF THE INVENTION

Figure 1:
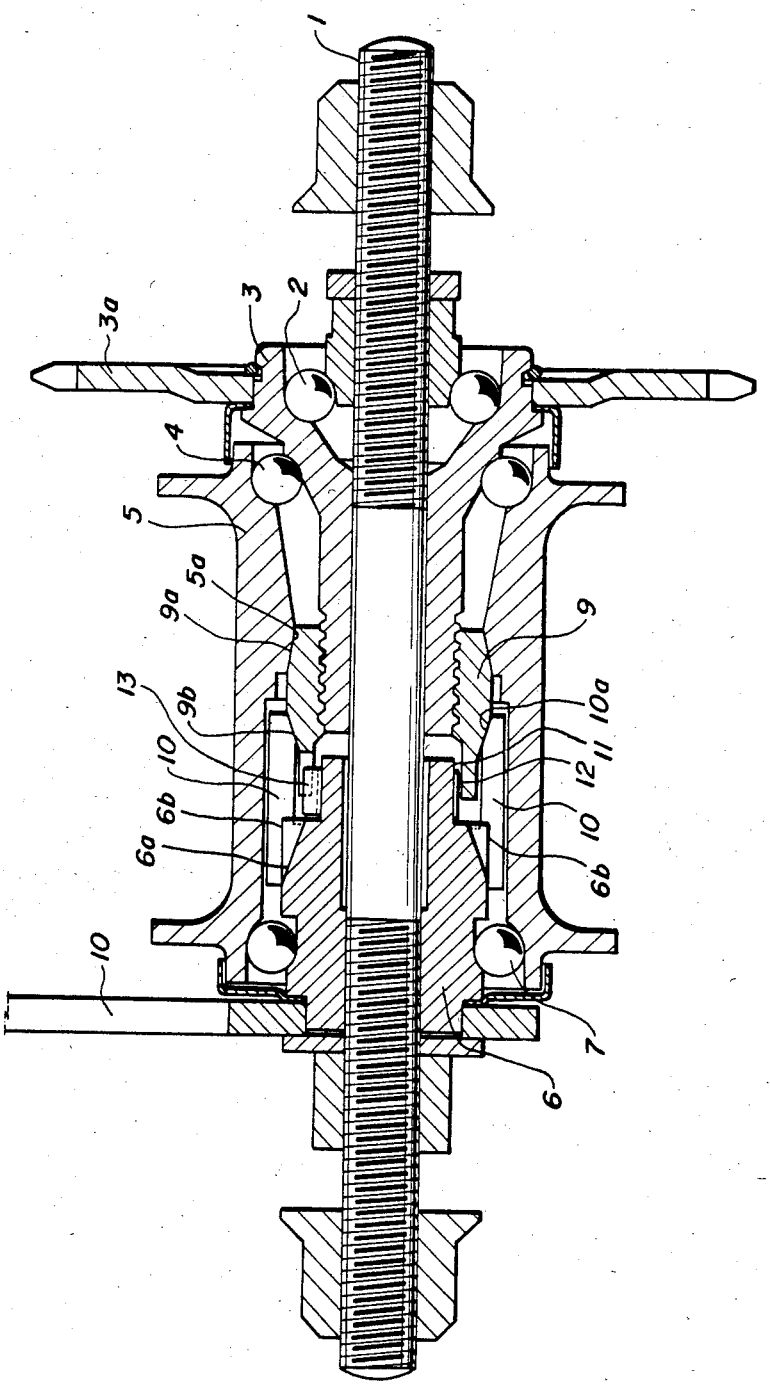
FIG. 1 is a longitudinal sectional view of the coaster brake of this invention in the driving state.

In the figures a male screw cylinder 3 is freely fitted through bearings 2 into a shaft 1 of the rear wheel of a bicycle. One end (right side in FIG. 1) of the hub body 5 is fitted through bearings 7 onto the external circumference of the brake cone 6.

The root end of an arm lever 8 is fixed to the external circumference of the brake cone 6 and the top end of the arm lever 8 is mounted to the partial section of the bicycle body, whereby the brake cone is fixed.

A sprocket 3a engaging with a chain C is fixed to the external end part of the male screw cylinder 3, and the male screw thread is provided at the inner end part of the male screw cylinder 3. This screw thread is engaged with the screw cone 9.

Figure 3:
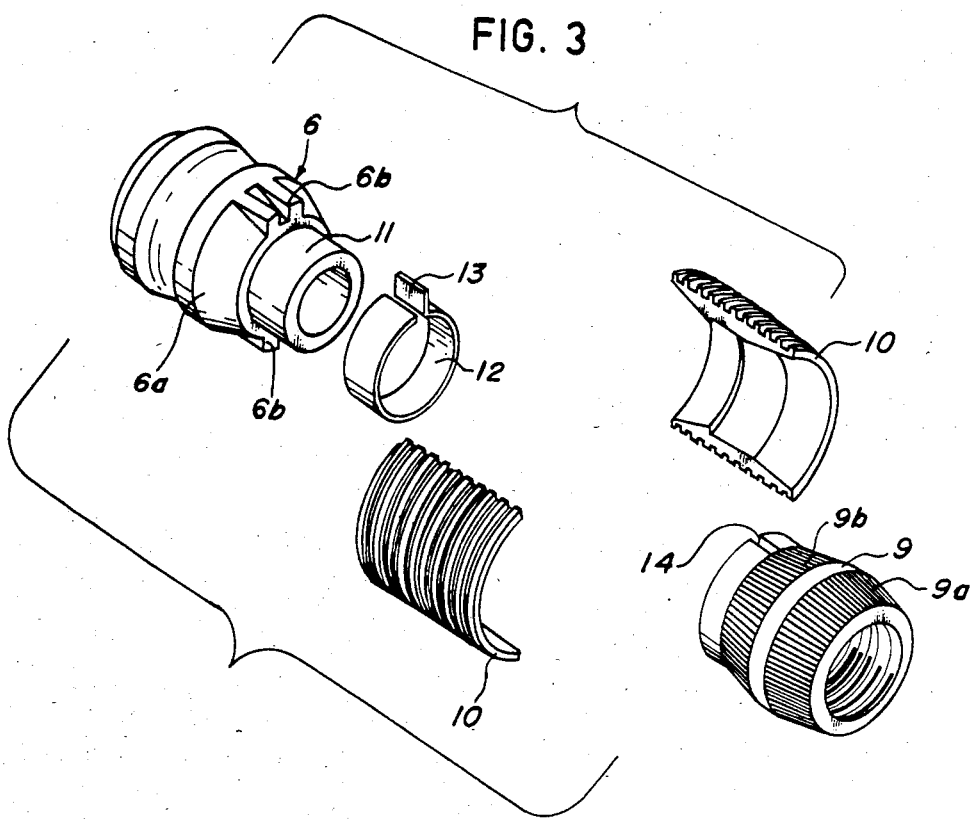
FIG. 3 is an exploded view of the brake.

The outer surface of the screw cone 9 is tapered from the center to both ends such that the diameter of the center is gradually reduced towards both ends, and the tapered surfaces 9a and 9b are formed with irregular teeth-shaped patterns thereon, respectively (see FIG. 3).

An inclining part 5a, which meets the tapered surface 9a of the screw cone 9, is formed on the internal wall of the hub body 5. On the other hand, an inclined part 10a, which meets the tapered surface 9b of the screw cone 9, is formed on the inner surface of the brake shoe 10. This brake shoe 10 is divided into two sections, both which are provided in the hub body 5.

The other end (the left side in FIG. 1) of the brake shoe 10 is received and supported by the brake cone 6. The tapered part 6a is formed on the inner end of the brake cone 6. The inclined part 10b of the brake shoe 10 is received in the tapered part of the brake cone 6. Two projections 6b are formed diametrically opposite on the brake cone 6, respectively so as to prevent the brake shoe 10 from coming off.

A projected cylindrical section 11 of a small diameter is formed on the inner end of the brake cone 6 such that the cylindrical section 11 enter the inner part of the screw cone 9. The clutch spring 12 is shaped into a circular form and fitted onto the cylindrical section 11 such that the cylindrical section 11 seems to hold the clutch spring 12.

The top end of the clutch spring 12 which is fitted onto the the cylindrical section 11 of the brake cone 6 is bent to form a projection 13. This projection 13 is adapted to be in mesh with an axial notch 14 provided on the inner end of the screw cone 9. At that time, it is acceptable for the projection 13 to be, for example, in a rod-shaped structure, as long as the projection is provided on one end of the clutch spring 12. In other words, the projection 13 has to be engaged with the notch 14 of the screw cone 9. The clutch spring 12 fitted onto the cylindrical section 11 of the brake cone 6 has directional properties.

That is to say, the foregoing structure is made so that when the screw cone 9 forwardly rotates while being meshed with the projection 13, the clutch spring 12 held around the cylindrical section 11 is directed to open, whereas reverse rotation thereof directs the clutch spring to be fastened.

In place of dividing the brake shoe 10 into two sections, it may also be divided into three sections.

Figure 4:
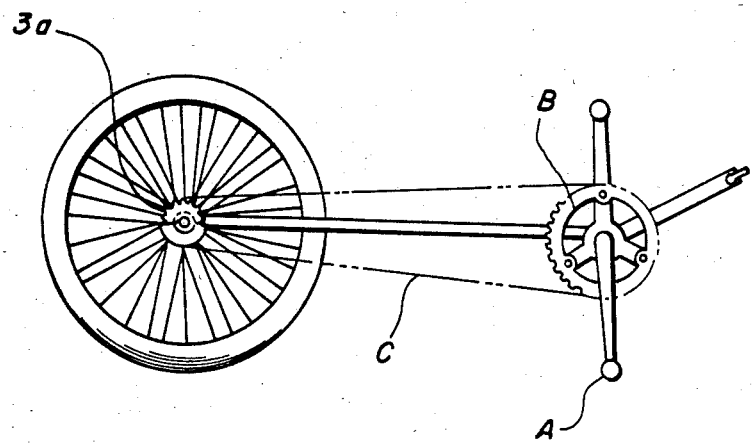
FIG. 4 is a schematic side view of a bicycle on which the brake of this invention is mounted

Referring to FIG. 4, when the pedal A is turned clockwise, the sprocket 3a is rotated through a front gear B and a chain C. Such a rotational motion moves the male screw cylinder 3 to the right (as shown in FIG. 11). Then, the tapered surface 9a of the screw cone 9 tightly contacts the inclined part of the hub body 5, thereby transmitting the rotational force of the sprocket to the hub body 5.

At that time, the outward force does not exert any action on the brake shoe 10, and a clearance is maintained between the brake shoe 10 and the hub body 5. A sliding motion takes place between the tapered surface 9b of the screw cone 9 and the inclined part 10a, of the brake shoe. Furthermore, the rotational force is exerted in the direction always opening the clutch spring 12 which is in mesh with the screw cone 9, while the clutch spring 12 skids on the cylindrical part 11.

Next, in order to perform braking, the pedal is turned counter clockwise so that the front sprocket B, the chain C and the sprocket 3a rotate in a reverse direction opposite to that mentioned above. The screw cone 9 being in mesh with the male screw cylinder 3 is ensured to move to the left without skidding (see FIG. 2). Namely, when the screw cone 9 skids with the male screw cylinder 3, the clutch spring 12 meshed with the screw cone 9 rotates together. However, such rotation may be avoided, because in contrast with the foregoing case, the rotational force acts in the direction fastening the clutch spring 12, which tightly contacts the cylindrical section 11 of the brake cone 6. For this reason, the rotation of the screw cone 9 being in mesh with the clutch spring 12 is stopped.

Figure 2:
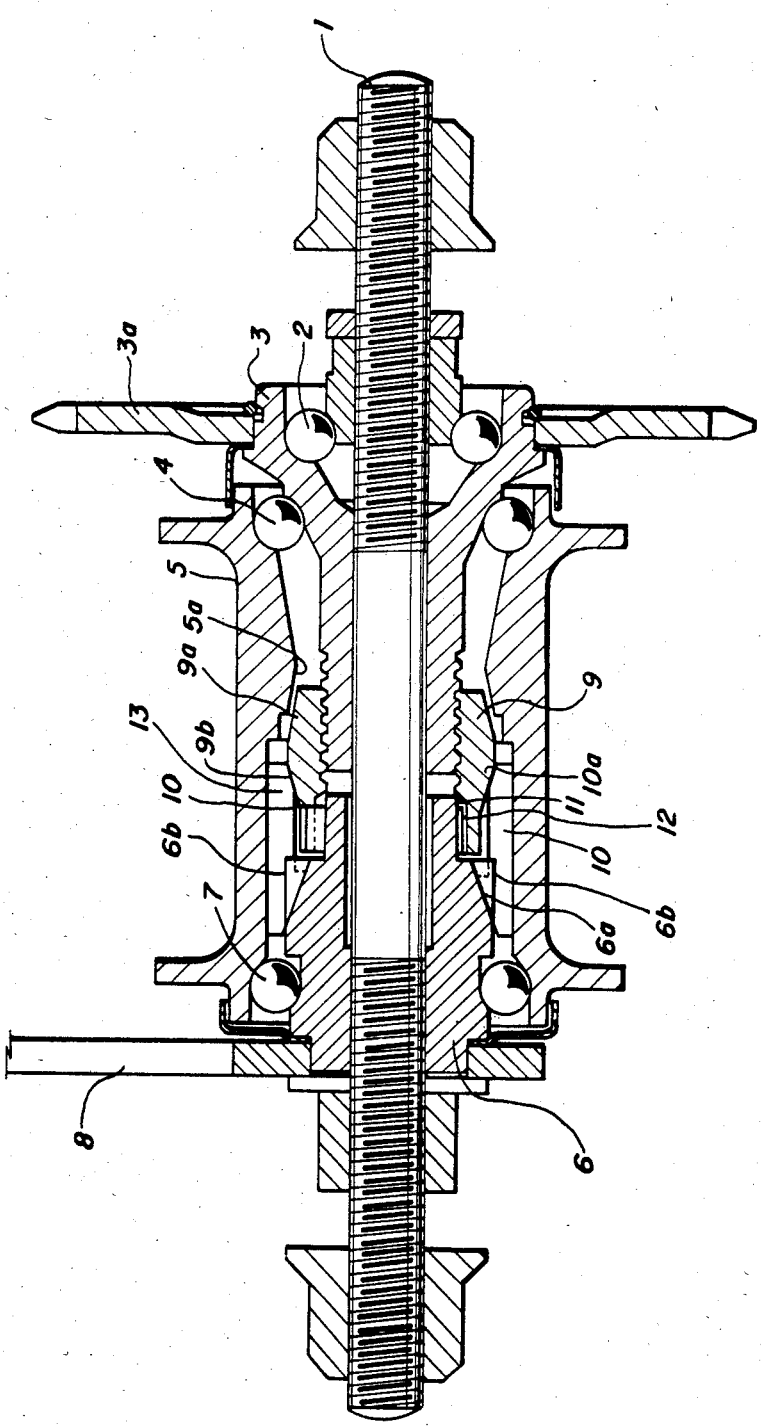
FIG. 2 is a longitudinal sectional view of the coaster brake under the driving state.

When the screw 9 is moved to the left as shown in FIG. 2 to release the tight contact of the tapered surface 9a of the screw cone 9 to the inclined part 5a of the hub body 5, the tapered surface 9b tightly contacts the inclined part 10a. The brake shoe 10 is then pressed to expand outwardly so that the frictional force thereby takes place between the brake shoe 10 and the hub body 5, thereby exerting braking action.

According to the coaster brake of the present invention, forward and reverse rotation of the pedal moves the screw cone 9 being meshed with the male screw cylinder 3 which is interlocked with said pedal, and performs braking and driving of the bicycle. At this time, since the screw cone 9 meshes with the clutch spring 12 which is fitted onto the cylindrical section of the brake cone 6, the fixed member of the screw cone does not skid with the male screw cylinder and driving and braking can be performed smoothly. Braking and driving can be put promptly into effect due to the accurate movements of the screw cone which corresponds to the rotation of the male screw cylinder.

I claim:

1. A coaster brake comprising:

a hollow hub body;

a shaft extending through said hub body substantially along the axis of said hub body;

a male screw cylinder provided in one side of said hollow hub body and rotatably supported by said shaft, said male screw cylinder being provided with an external screw thread;

a sprocket for being driven in a first and a second rotational direction coupled to said male screw cylinder;

a brake cone provided in another side of said hollow hub body opposing said male screw cylinder and rotatably supported by said shaft, said brake cone being provided with a tapered conical surface and a cylindrical portion extending from said tapered conical surface towards said male screw cylinder and at least one projection provided on said tapered conical surface;

a screw cone having an internal thread threaded onto said external thread of said male screw cylinder, said screw cone having a tapered portion at an end of said screw cone opposing said brake cone and a notch provided in said tapered surface, said internal thread of said screw cone and said external thread of said male screw cylinder being arranged and configured such that when said male screw cylinder is rotated in said second direction and said male screw cylinder rotates relative to said screw cone, said screw cone moves towards said brake cone;

a clutch spring surrounding said cylindrical portion of said brake cone and having a projection which is engaged with said notch in said screw cone, said clutch spring being arranged configured such that when said projection is rotated in said second rotational direction, said clutch spring engages with said cylindrical portion of said brake cone; and a pair of brake shoes provided in said hub body between said brake cone and said screw cone for engagement with an inner surface of said hub body when said sprocket is rotated in said second rotational direction, said brake shoes each having an inner surface which is provided at both ends with an inclined portion, said inclined portions engaging with said tapered conical surface of said brake cone and said tapered portion of said screw cone, said brake shoes further having said projection of said tapered conical surface of said brake cone provided therebetween.

* * * * *